June 5, 1962 C. E. QUINN 3,037,575
VEHICLE GUIDANCE SYSTEM
Filed May 22, 1958
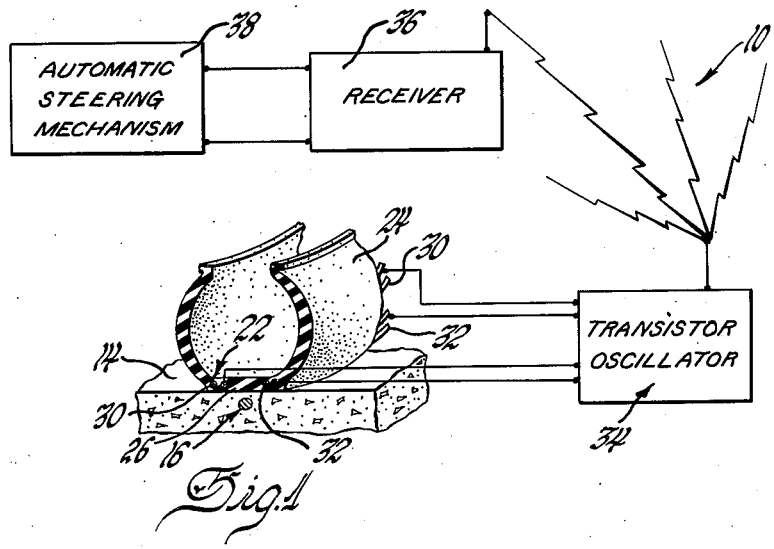
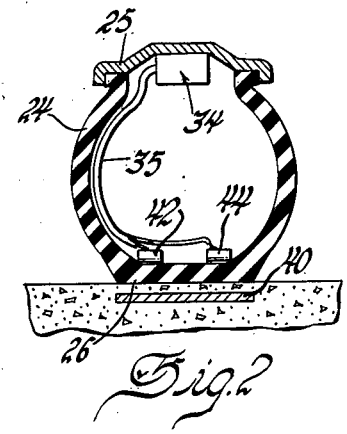
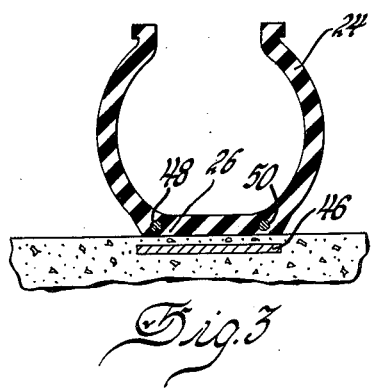
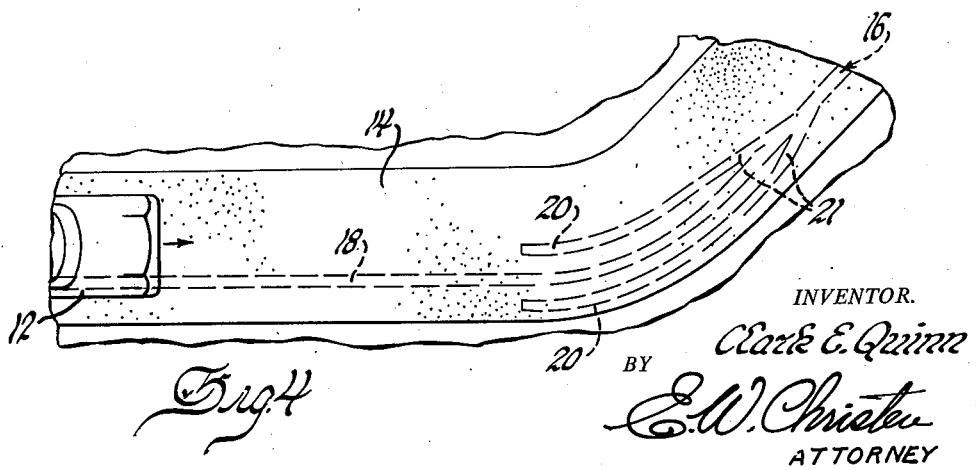
INVENTOR.
Clark E. Quinn
BY
E. W. Christen
ATTORNEY

3,037,575
VEHICLE GUIDANCE SYSTEM
Clark E. Quinn, Rochester, Mich., assignor to General Motors Corporation, Detroit, Mich., a corporation of Delaware
Filed May 22, 1958, Ser. No. 737,154
6 Claims. (Cl. 180—79.1)

The present invention relates to automotive vehicles, and more particularly, to means for automatically guiding such vehicles along a predetermined path.

At the present time automotive vehicles, trucks, etc. travel along the surface of a road and are manually controlled by an operator. This requires the constant attention of the operator and, as a result, is very fatiguing. In addition, it has been found that a large percentage of automotive accidents are caused as a result of error by the operator rather than a mechanical failure. Accordingly, considerable amount of effort is being expended to provide a control system for automatically guiding the vehicle along a predetermined path. In some of these systems a strip of material or a cable is buried in the surface of the roadway so as to define the path which the vehicle is to follow. Any vehicles equipped to automatically follow this path carry one or more pickups adapted to sense the relative position of the cable and actuate the steering system to thereby maintain the pickup in a fixed relative position to the cable. When such a vehicle travels along the roadway, the height of the vehicle relative to the roadway varies. This produces corresponding variations in the spacing between the pickups and the cable. These variations tend to affect the sensitivity and accuracy of the guidance system.

It is now proposed to provide a guidance system in which the distance between the guiding cable and the pickups will remain substantially constant at all times. More particularly, this is to be accomplished by providing the pickups in a road wheel. Preferably, they are embedded in or mounted on the tire immediately adjacent the tread. As a result the spacing of the pickups from the cable will be independent of the height of the vehicle from the roadway. The pickups may comprise a pair of wire loops that are axially spaced from each other and positioned to extend circumferentially around the tire. The spacing between the two loops positions them so that they will normally straddle the guidance cable so as to receive a signal therefrom. The intensity of the signals will be equal if they are equally spaced from the cable. In the event they are not equally spaced, the pickup closest to the cable will have the stronger signal. The pickups are operatively interconnected with the steering system by any suitable means such as a transmitter located on the wheel and a receiver located in the vehicle. This arrangement may thus be responsive to any deviations of the vehicle and effective to actuate the steering system to produce a corrective steering action that will return the vehicle to the prescribed path.

In previous guidance systems it has been customary to provide a single guidance cable for steering the vehicle. Consequently, in the event the lateral deviation of the vehicle from the prescribed path becomes excessive, the pickups will fail to receive a proper guidance signal therefrom. As a result the vehicle will be out of control with no means for automatically returning the vehicle to the path.

It is now proposed to provide a guidance system having means for returning the vehicle to the main path even though it should become sufficiently displaced for the pickups to fail to receive a signal therefrom. More particularly, this is to be accomplished by providing a secondary cable positioned parallel to the primary cable but laterally displaced therefrom. Thus, in the event the vehicle becomes displaced from the primary path, the pickups will sense the presence of the secondary path and cause the vehicle to be automatically guided therealong. The posterior end of the secondary cable is periodically interconnected with the primary cable. Thus the vehicle will be automatically returned to a position where the pickups will sense the presence of the primary cable and resume guiding the vehicle therealong.

In the drawing:

FIGURE 1 is a diagrammatic showing of a control system embodying the present invention.

FIGURE 2 is a cross-sectional view of a wheel and tire and a portion of a roadway embodying one form of the invention.

FIGURE 3 is a cross-sectional view of a tire and a portion of a roadway embodying another form of the present invention.

FIGURE 4 is a fragmentary plan view of a roadway incorporating the guidance system of FIGURE 1.

Referring to the drawings in more detail the present invention may be included in a guidance system 10 for automatically directing an automotive vehicle 12 along a predetermined path extending down one lane of a roadway 14. The path is determined by the disposition of a conductive cable 16 which is preferably embedded in the roadway 14 immediately below the surface thereof. The present cable 16 is adapted to carry an alternating electric current therein which will radiate an electromagnetic field thereabout. Although the frequency of this current may be any desired amount, it is preferably above the audio range and sufficiently below any value that would interfere with any radio receivers in the vehicles.

The guidance cable 16 may be arranged to have a primary portion 18 thereof defining the path that the vehicle 12 is to travel over. In addition, one or more secondary cables 20 may be also provided in the surface of the roadway 14 substantially parallel to the primary portion 18. Thus, in the event the tire pickups become sufficiently laterally displaced to lose the signal from the primary portion 18, it will have to pass over a secondary cable 20 and thereby sense the signal from this secondary cable 20. As a consequence, the vehicle 12 will be guided along this secondary cable 20. Periodically, the posterior ends 21 of these secondary cables 20 are interconnected with the primary portion 19 so as to switch the vehicle 12 back to the primary portion 18.

At least one of the road wheels of the vehicle is equipped with a pickup means 22 adapted to sense the position of the cable 16 relative to the wheel. This wheel is preferably on the front end of the vehicle and comprises a dirigible wheel. The wheel is equipped with a pneumatic tire 24 having a tread portion 26 adapted to roll along the surface of the roadway 14. The pickup means 22, which is preferably molded into tread portion 26 of the tire 24, comprises a pair of electrically conductive wires that are arranged to form a pair of axially spaced loops 30 and 32 that extend circumferentially around the entire tire 24. The axial spacing of these loops 30 and 32 is normally adequate to allow them to straddle the guidance cable 16 and thereby be disposed on the opposite sides thereof. As a consequence, each loop 30 and 32 will receive a signal which is radiated by the cable 16 and has a strength or amplitude determined by the displacement between the loops 30 and 32 and the cable 16. As a result, the loop 30 or 32 closest to the cable 16 will receive the strongest signal. In the event the two loops 30 and 32 are equally spaced from the cable 16, both loops will have a signal of identical strength therein.

As a result, it may be seen that the relative strengths of the signals will be indicative of the displacement of the tire 24 from the cable 16. The direction of displacement will be indicated by the polarity or phase of the difference signal. Accordingly, the two pickups may be interconnected, e.g., as depicted in FIGURE 1 through the sidewall of the tire 24, with a circuit 34 that is adapted to produce an output signal which characterizes the relative strengths of the signals in the wire loops 30 and 32. This circuit preferably includes a suitable transistorized transmitter that radiates a signal modulated by the difference between the signals in the two pickups. The disposition of the transistorized transmitter 34 relative to the wheel may be made in any known manner as will be understood by those versed in the art, e.g., the transmitter 34 may be secured to the hub of the wheel so as to be revolvable therewith or attached to the wheel axle so as to not revolve therewith. A receiver 36 is provided on the vehicle 12 that is tuned to receive the signal radiated from the transmitter. The receiver 36 is in turn interconnected with a suitable power steering system 38 effective to control the dirigible wheels of the vehicle 12.

If the tire 24 is rolling along the surface of the road 14 with the two pickups 30 and 32 equally spaced on opposite sides of the cable 16, the signals in the loops will be equal and no corrective signal will be supplied to the steering system 38. However, if the tire 24 is displaced laterally from the cable 16, one loop 30 or 32 will receive a stronger signal than the other loop. This will cause the transmitter to radiate a correction signal to the receiver 36 that will cause the steering system 38 to turn the vehicle 12 to return the tire 24 to a centered position.

As an alternative the embodiment in FIGURE 2 may be employed. In this embodiment the vehicle's path is defined by a band 40 of material which is either disposed on top of the road 14 or is embedded in the surface thereof. The pickups 42 and 44 comprise a pair of axially spaced coils that are bonded or otherwise secured to the interior surface of the tire 24. When the tire 24 is adjacent this band 40, the coils 42 and 44 will be sufficiently close thereto to have the inductances thereof affected by the material in the band 40. Consequently, if the two pickups 42 and 44 are disposed between the extremities of the band 40 as illustrated in the drawings, the inductance thereof will be substantially equal. However if the tire 24 is displaced laterally to one side, one of the pickups will be disposed over the band 40 while the other will not be. As a result, the inductance of the two coils 42 and 44 will become unbalanced. Thus the transmitter will radiate a signal to the receiver 36 which will be effective to apply a corrective steering action to the steering system 38. This will return the tire 24 so that the two pickups will be disposed over the band 40 of material in the roadway 14.

FIGURE 2 also shows a portion of a wheel 25 upon which the tire 24 is mounted. The transistor oscillator 34 is shown mounted on the wheel 25 and connected to the coils 42 and 44 by a cable 35.

As a further alternative the embodiment disclosed in FIGURE 3 may be employed. In this embodiment the vehicle's path is also defined by a band 46 of material. The pickups 48 and 50 comprise a pair of loops of wire or metal ribbons which are embedded in the tread portion 29 of the tire 24. If the two pickups 48 and 50 are disposed over the band 46, the capacitance between the two pickups 48 and 50 and the band will be equal. However, in the event the tire 24 is positioned so that only one of the two pickups 48 or 50 is disposed over the band 46 while the other is not, the capacitances will be unequal. This, in turn, will cause the transmitter to radiate a signal to the receiver 36 so as to produce a corrective steering action effective to return the tire 24 to a position in which the two pickups 48 and 50 will be disposed over the band 46 of material.

It is to be understood that, although the invention has been described with specific reference to particular embodiments thereof, it is not to be so limited since changes and alterations therein may be made which are within the full intended scope of this invention as defined by the appended claims.

What is claimed is:

1. A guidance system for guiding a vehicle having dirigible wheels controlled by a steering system, said guidance system comprising a strip of conductive material arranged along a road to define the path said vehicle is to travel, said strip carrying an alternating current so as to radiate an alternating electromagnetic field, pickup means mounted adjacent the outer periphery of at least one of said wheels for sensing the electromagnetic radiations and thereby detecting the relative positions of said wheel and strip, means operatively interconnecting said pickup means with said steering system for actuating said steering system to maintain said wheel adjacent said strip.

2. A guidance system for guiding an automotive vehicle having dirigible wheels controlled by a steering system, said guidance system comprising a guidance strip extending longitudinally along a road and defining a path said vehicle is to travel, a pair of pickups in the form of circular conductors mounted around the outer periphery of the tire of at least one of said wheels said pickups being co-axial with said tire and axially spaced to normally straddle said strip and thereby be reactively coupled to said strip, means operatively interconnecting said pickups with said steering system of said vehicle for actuating said steering system to maintain said wheels adjacent said strip.

3. In an automotive vehicle having road wheels for traveling along the surface of a road with a guiding strip defining the path said vehicle is to travel, a pair of capacitive pickups in the form of conductors mounted around the outer periphery of the tire of one of said wheels and being axially spaced from each other so as to normally straddle said strip, electrical means connected to said pickups for determining the relative capacitances between said pickups and said strip, a steering system for controlling said road wheels to determine the direction of travel of said vehicle, means operatively interconnecting said electrical means with said steering system for actuating said steering system to maintain said capacitances balanced whereby said pickups will be equally spaced from said strip.

4. In an automotive vehicle having road wheels for traveling along the surface of a road with a guidance strip defining the path said vehicle is to travel, a pair of inductive pickups in the form of conductors mounted around the outer periphery of the tire of one of said wheels, said pickups being axially spaced from each other so as to normally straddle said strip, a steering system for controlling said wheels to determine the direction of travel of said vehicle, electrical means connected to said pickups for determining the relative inductances between said pickups and said strip, means operatively interconnecting said electrical means with said steering system for actuating said steering system to maintain said inductances balanced whereby said pickups will be equally spaced from said strip.

5. In an automotive vehicle having road wheels for traveling along the surface of a road with a guidance strip defining the path said vehicle is to travel, pickup means carried by at least one of said wheels for detecting the relative position of said guidance strip and said pickup means, a steering system for controlling said road wheels to determine the direction of travel of said vehicle, a transmitter disposed on said wheel and interconnected with said pickup, a receiver in said vehicle interconnected with said steering system and tuned to receive signals from said transmitter, said receiver being effective to actuate said steering system for maintaining at least one of said wheels adjacent said strip.

6. A guidance system for guiding a vehicle having dirigible wheels controlled by a steering system, said guidance system comprising a primary guidance strip extending longitudinally along a road and defining a curved path said vehicle is to travel, a secondary strip located adjacent said primary strip along the curved path, said primary strip being spaced by a substantially constant distance from said secondary strip throughout the curved path with the end thereof intersecting said primary strip at the end of the curved path, pickup means carried by at least one of said wheels for detecting the position of said guidance strips, said pickup means being equally responsive to the effect of either of said strips, means operatively interconnecting said pickup means with said steering system of said vehicle for actuating said steering system so as to maintain said wheel adjacent said strips, the spacing of said secondary strip relative to said primary strip being such it never exceeds two times the effective range of detection of said pickup means so that when the pick-up means is out of range of said primary strip, due to the vehicle being off-course relative to said path defined by said primary strip, said secondary strip will coact with said pickup means and cause said vehicle to be returned on-course to said path defined by said primary strip.

References Cited in the file of this patent

UNITED STATES PATENTS

| | | |
|---|---|---|
| 1,343,062 | Roan | June 8, 1920 |
| 2,339,291 | Palus et al. | Jan. 18, 1944 |
| 2,576,424 | Sunstein | Nov. 27, 1951 |
| 2,661,070 | Ferrill | Dec. 1, 1953 |
| 2,791,167 | Lockmiller | May 7, 1957 |
| 2,847,080 | Zworkykin et al. | Aug. 12, 1958 |

OTHER REFERENCES

Barrett-Cravens Co., Bulletin No. 552-1, "Guide-O-Matic Operatorless Tractor"; May 18, 1955.